(12) United States Patent
Subramanian et al.

(10) Patent No.: US 8,961,007 B2
(45) Date of Patent: Feb. 24, 2015

(54) THERMOCOUPLE AND METHOD OF FORMING A THERMOCOUPLE ON A CONTOURED GAS TURBINE ENGINE COMPONENT

(75) Inventors: Ramesh Subramanian, Oviedo, FL (US); Anand A. Kulkarni, Oviedo, FL (US); Kevin C. Sheehan, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 263 days.

(21) Appl. No.: 13/417,448

(22) Filed: Mar. 12, 2012

(65) Prior Publication Data
US 2012/0236899 A1 Sep. 20, 2012

Related U.S. Application Data

(60) Provisional application No. 61/452,735, filed on Mar. 15, 2011.

(51) Int. Cl.
| | | |
|---|---|---|
| *G01K 7/00* | (2006.01) | |
| *G01K 1/02* | (2006.01) | |
| *C23C 28/00* | (2006.01) | |
| *F01D 17/08* | (2006.01) | |
| *G01K 7/02* | (2006.01) | |
| *G01K 11/12* | (2006.01) | |
| *G01K 13/02* | (2006.01) | |

(52) U.S. Cl.
CPC ............ *G01K 1/026* (2013.01); *C23C 28/30* (2013.01); *C23C 28/3215* (2013.01); *C23C 28/3455* (2013.01); *F01D 17/085* (2013.01); *G01K 7/028* (2013.01); *G01K 11/12* (2013.01); *G01K 2013/024* (2013.01); *G01K 2205/00* (2013.01); *G01K 2217/00* (2013.01); *F05D 2230/13* (2013.01); *F05D 2230/31* (2013.01)
USPC ................................ 374/179; 374/1

(58) Field of Classification Search
CPC ................................. C23C 16/487
USPC .......................... 374/163, 179, 183, 185, 208
See application file for complete search history.

(56) References Cited

U.S. PATENT DOCUMENTS

| | | | |
|---|---|---|---|
| 5,251,481 A | 10/1993 | Huck et al. | |
| 5,281,025 A * | 1/1994 | Cali et al. ...................... | 374/141 |
| 6,636,142 B2 | 10/2003 | Geier et al. | |
| 7,004,622 B2 * | 2/2006 | Hardwicke et al. ........... | 374/141 |
| 7,280,028 B2 | 10/2007 | Nelson et al. | |
| 7,550,290 B2 | 6/2009 | Yamamoto | |
| 7,741,125 B2 | 6/2010 | Taniike et al. | |

(Continued)

FOREIGN PATENT DOCUMENTS

WO          2010014336 A1     2/2010

*Primary Examiner* — Lisa Caputo
*Assistant Examiner* — Nasir U Ahmed

(57) ABSTRACT

A method of forming a thermocouple (12), including: depositing a first material on a component (10) to form a first leg (14); depositing a second material through a mask (30) to form a pattern (50) on the component (10), the pattern (50) forming a plurality of discrete second leg junction ends (20) and a continuous patch (52) of the second material comprising indiscrete lead ends of the second legs (16), each second leg junction end (20) spanning from a respective junction (18) with the first leg (14) to the continuous patch (52); and laser-ablating the continuous patch (52) to form discrete lead ends (22) of the second legs (16), each lead end (22) electrically connected to a respective junction end (20), thereby forming discrete second legs (16).

18 Claims, 5 Drawing Sheets

(56) References Cited

U.S. PATENT DOCUMENTS

| | | | |
|---|---|---|---|
| 7,753,584 B2 * | 7/2010 | Gambino et al. | 374/179 |
| 8,033,722 B2 | 10/2011 | Kulkarni et al. | |
| 2005/0214564 A1 * | 9/2005 | Subramanian | 428/633 |
| 2008/0278793 A1 | 11/2008 | Tonar et al. | |
| 2010/0027584 A1 * | 2/2010 | Kulkarni et al. | 374/179 |
| 2010/0319436 A1 | 12/2010 | Sun et al. | |
| 2011/0222582 A1 | 9/2011 | Subramanian et al. | |

* cited by examiner

THERMOCOUPLE AND METHOD OF FORMING A THERMOCOUPLE ON A CONTOURED GAS TURBINE ENGINE COMPONENT

This application claims benefit of the 15 Mar. 2011 filing date of U.S. provisional patent application No. 61/452,735.

FIELD OF THE INVENTION

The invention relates generally to thin film sensors on gas turbine engine components. More particularly, the invention relates to a method of forming thin film thermocouples on contoured hot gas path components.

BACKGROUND OF THE INVENTION

Components of a gas turbine engine that are exposed to hot combustion gases are being operated closer to their design limits as gas turbine engine designs continue to increase the operating temperatures of the combustion gases. Operating closer to the design limit tends to reduce a life-span of the component when compared to a lifespan when operated in a cooler environment. Once a component reaches the end of its lifespan it must be replaced, and this necessitates a shutdown of the gas turbine engine. Such shut downs are expensive and time consuming. Without any means of determining how much of the component's lifespan may be left, component replacement often takes the form of preventative maintenance. As a result, a component may be removed prior to the end of its life. This is considered a better alternative to unintentionally leaving a component in operation beyond the end of its lifespan and risking a catastrophic failure of the component. Concurrently, there exists a desire to monitor the operating environment within the gas turbine engine to optimize turbine operation according to real time conditions.

Smart components have been developed in response to the above needs. Smart components may include sensors built into the component itself, where the sensors gather information about the operating environment and transmit that information outside of the operating environment. That information may be used to enable condition based maintenance instead of preventative maintenance, and to optimize turbine operation as desired.

Conventional smart component installation practice involves mounting sensors to the components, running lead wires to routers, and bringing large bundles of lead wires out of the turbine and over long distances to a monitoring station. The instrumentation process is slow, labor intensive, expensive, unreliable, and requires modification of many of the components in order to allow for the inclusion of all the lead wires.

BRIEF DESCRIPTION OF THE DRAWINGS

The invention is explained in the following description in view of the drawings that show.

DETAILED DESCRIPTION OF THE INVENTION

Figure 1:
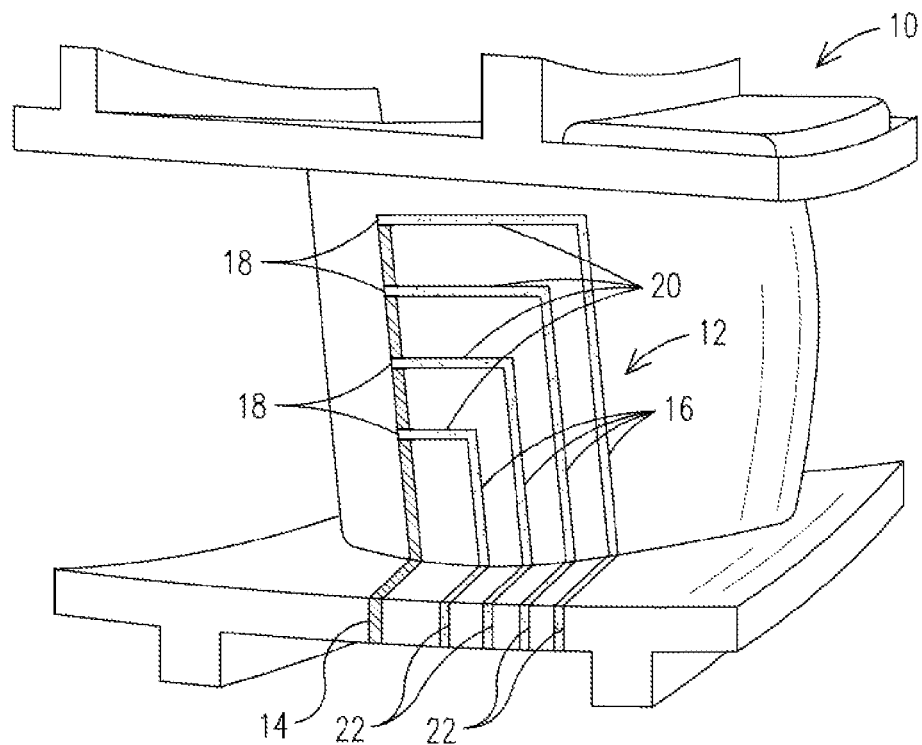
FIG. 1 shows a contoured vane with a thin film thermocouple.

A recent innovation in thin film smart sensors includes thermocouples where a common first leg and a plurality of second legs, each forming a junction with the common first leg, define a thermocouple on a component having multiple junctions (which equivalently may be viewed as multiple thermocouples having a common leg). This is disclosed in a commonly assigned United States Patent Application Publication number US 2011/0222582 A1, which is incorporated by reference herein. Hot gas path components include but are not limited to blades, vanes, ring segments etc. Suitable first and second leg materials are dissimilar, able to withstand the operating conditions, and ideally include a coefficient of thermal expansion comparable to that of an adjacent surface, such as a surface onto which the materials are deposited. When on or within a thermal barrier coating of a gas turbine engine hot gas path component, materials from precious metal group can be selected. In an exemplary embodiment, metals from the platinum group metals may be selected. In an exemplary embodiment platinum and palladium may be selected as first and second materials respectively. These materials have suitable coefficients of thermal expansion, and are able to withstand the operating temperatures, which may range from 500° C. to 1500° C.

The thermocouple materials may be sprayed directly onto a substrate, onto a bond coat, or onto a thermal barrier coating (TBC). When sprayed onto a substrate, the thermocouple may be covered by the bond coat. When sprayed onto the bond coat the thermocouple may be covered by the thermal barrier coating. When sprayed onto the TBC material, the thermocouple may lie on the exposed surface, or be covered with additional TBC material. Alternately, the thermocouple may be applied such that it is surrounded on one or both sides by a dielectric material. Suitable dielectrically insulating materials may include oxide materials. In an exemplary embodiment the oxide material may be aluminum oxide or yttrium aluminum garner (YAG) oxide. In an exemplary embodiment, the thermocouple may be applied at the superalloy/bond coat interface such that it is surrounded on both sides by the dielectric material. In an alternate exemplary embodiment, the thermocouple may be applied at the bond coat/TBC interface such that it is surrounded on both sides by the dielectric material.

To form the thermocouple, the common first leg is applied through a first mask. To form the other legs, a devoted mask is applied per leg and material is applied through the devoted mask. For example, if there are four thermocouples, four second legs would be formed on the component, each forming a separate junction with the common first leg. Consequently, the steps of applying a devoted mask and applying the second material would need to be repeated four times to form the second legs.

Gas turbine engine components are often contoured, and thus it is difficult to make rigid masks through which the material may be applied. As a result, flexible masks may be used. Further, in an exemplary embodiment the material may be applied through an air plasma spraying process (APS). Air from this process may catch edges of the mask and lift them. Such lifting may permit small amounts of material to deposit under the mask. Further, heat associated with the process may warp the thin mask, yielding the same result. In such instances, the physical characteristics of the deposited material, including width and thickness, may vary. Minor variations in the physical characteristics may yield variations in the electrical properties of the thermocouple. In particular, the resistance of a given thermocouple may vary from a target resistance as the width and thickness of the leg vary from their target dimensions. Resistance of the thermocouple influences output voltage, and that output voltage is used to estimate temperature. Consequently, using conventional manufacturing methods, these thin film smart sensors may require a certain amount of calibration.

The present inventors have devised an innovative method for forming the second legs of the thermocouple that decreases manufacturing time and improves the manufacturing tolerance achievable of a manufactured thermocouple from a target resistance. Specifically, the method disclosed herein utilizes a first mask to apply a first material that forms the first leg. Then, a second mask is used to apply a pattern of second material from which all second legs are formed. Each second leg includes a junction end and a lead end. The junction end forms a junction with the first leg. The lead end is configured to be connected to an external lead. The legs are formed by a process that removes excess patch material, including but not limited to laser ablation.

The pattern is configured such that discrete, junction ends of the plurality of second legs each form a junction with the first leg at respective locations, and these junction ends lead from the respective junctions to a patch of material that includes indiscrete lead ends of the second legs. The patch of material is a continuous patch from which the lead ends of the second legs will be formed. The continuous patch is then essentially a patch of material that covers a portion of the component that includes but is larger than where the lead ends of the second legs are to be. The method includes removing patch material from between where the lead ends are to be, thereby forming lead ends. Each lead end is electrically connected to a respective junction end. Since the junction ends are already discrete from each other, and the processes forms discrete lead ends connected thereto, the process forms a plurality of discrete second legs using only one mask, one application of second material, and a subsequent trimming operation. As a result it can be seen that the disclosed process is quicker.

Similar to the other process, this process may use a thin, flexible mask. Consequently, when an APS process is used it may likewise lift the edges of the mask and deposit second material where none is intended to be. However, the process disclosed dispenses with any disadvantages associated with this because once the second legs are trimmed to the desired shape and size, any extraneous material left on the component is electrically isolated from the second legs, and thus its presence has no effect on the thermocouple.

FIG. 1 shows an example of a contoured, gas turbine engine hot gas path vane 10 including an example thin film thermocouple 12. The thermocouple 12 includes a common first leg 14, a plurality of second legs 16, and a plurality of junctions 18 where junction ends 20 the second legs 16 intersect the common first leg 14. Lead ends 22 of the second legs 16 may be configured such that external leads (not shown) may be connected thereto.

Figure 2:
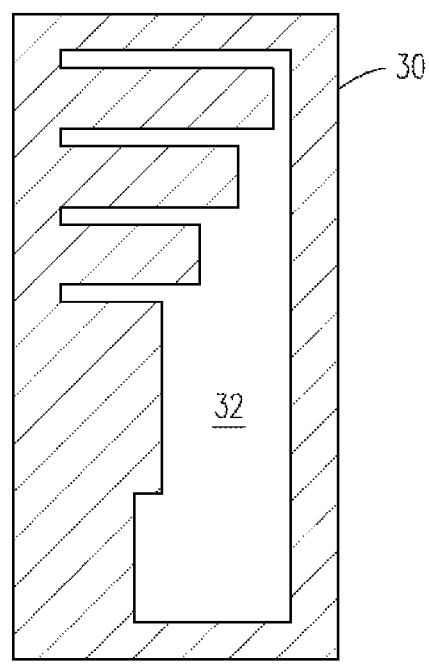
FIG. 2 shows a mask used to apply the second material of a thermocouple.

FIG. 2 shows a mask 30 with an opening 32. The opening 32 will be configured such that it leaves a pattern of second material on the component such that the pattern covers the component at least where the second legs are to be, as well as some of the component between the second legs.

Figure 3:
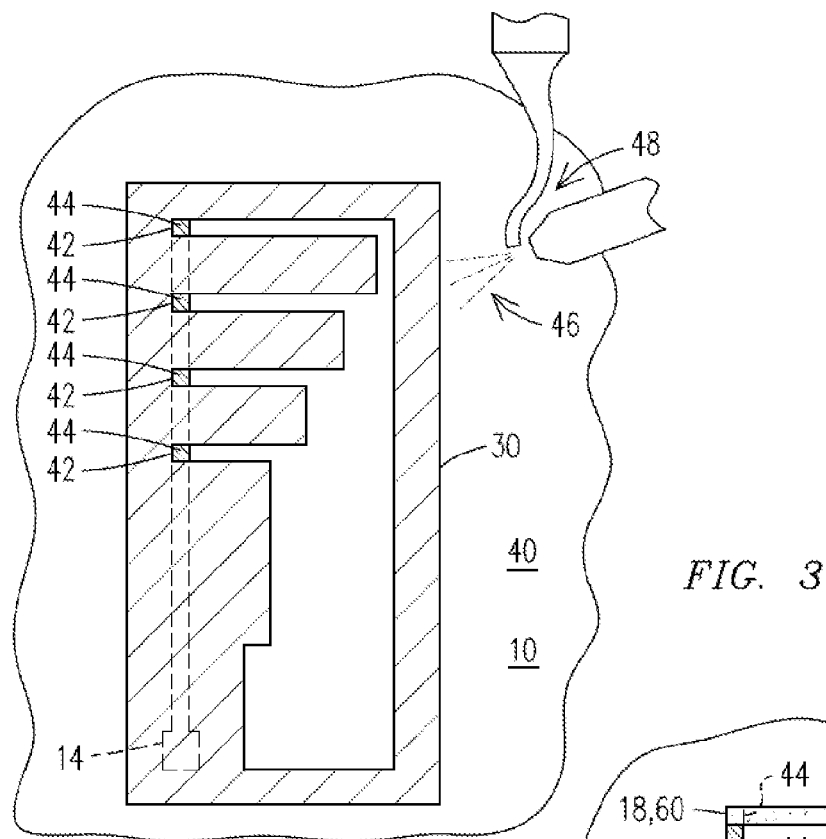
FIG. 3 shows the mask of FIG. 2 applied to a surface of a component.

As can be seen in FIG. 3, the pattern 30 is applied to a surface 40 of the component 10. The common first leg 14 has already been applied to the surface 40. The pattern 30 is positioned that tips 42 of each of the openings for the junction ends 20 expose a respective small portion 44 of the first leg 14. The small portions 44 of the first leg 14 form part of the junctions 18.

A second material 46 is applied via a process 48. In an exemplary embodiment the second material may be applied either in a powder or slurry form. APS deposition permits the application of powder material because APS deposition allows for tight control of the application, yet does not require a "booth" or spray "box" that may be too small for the components themselves to fit into. Other processes are limited by such booths, and therefore are unacceptable since the component often cannot fit into the restrictive booths. In APS deposition, the pattern may be built up from the application of a plurality of sublayers. Each pass of an APS process yields a sublayer of at least one micron thick. Multiple passes may build patterns to a thickness of, in an exemplary embodiment, ten microns or more. Such thickness may be compared with thicknesses of, for example, bond coat (150 micron) and thermal barrier coat (300 micron) thickness specifications. In another exemplary embodiment the pattern may be characterized by a thickness of approximately 50 to 75 microns.

Figure 4:
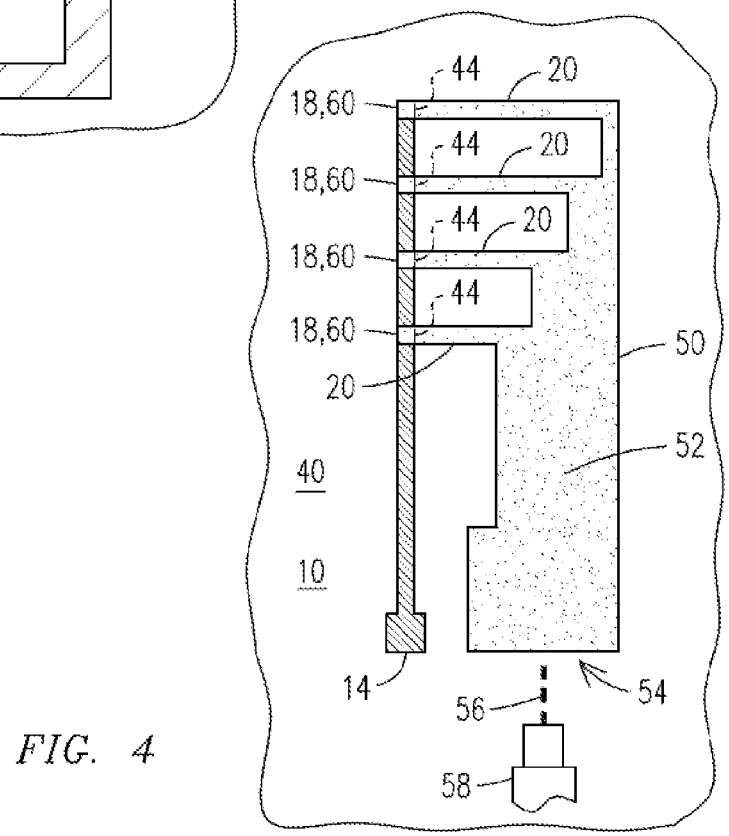
FIG. 4 shows a pattern of material applied to the surface of the component of FIG. 3.

In FIG. 4 the pattern 50 has been deposited and the mask 30 has been removed. The pattern includes a plurality of discrete, junction ends 20, and a patch 52 from which the lead ends of the second legs will be formed. The first leg 14 is visible on the surface 40 of the component 10, and the small portions 44 of the first leg 14 have been covered by tips 60 of the discrete junction ends 20, which form junctions 18 at various respective locations on the component. These locations may be chosen so that during operation each will be in a region of temperature that is different than the temperature of other junctions, and this may provide a temperature profile for the component.

The plurality of discrete junction ends 20 lead from respective junctions 18 to the common patch 52 of second material. The patch 52 leads to an interface location 54 where leads (not shown) may connect to the second legs 16. Since there are four discrete junction ends 20 in the exemplary embodiment, in order to make four thermocouples, each with a junction end 20 and a lead end, there must be four lead ends. It can be seen that the patch 52 covers a greater area than would four lead ends, and so it is possible to trim excess patch material in order to form the four lead ends. Removal of excess material may be performed by an accurate ablation technique, such as laser ablation. In laser ablation, a laser beam 56 from a laser 58 would be directed at patch material to be removed from between desired lead ends 22 of the second legs 16.

Figure 5:
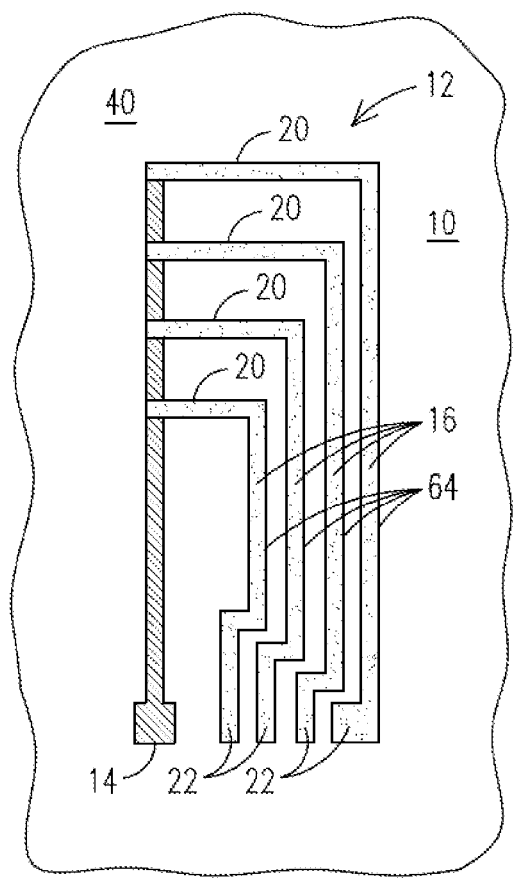
FIG. 5 shown a plurality of thermocouples formed from the pattern of FIG. 4.

In FIG. 5 the laser ablation has been completed. The lead ends 22 of the second legs 16 have been formed by removing patch material from there between. Each lead end 22 joins with each junction end 20 to form a discrete thermocouple 16. Using a laser to trim the lead ends allows for very tightly controlled edges 64 of the lead ends 22. Any stray patch material that is unwanted may simply be removed by the laser. The laser is accurate enough to remove only the patch material if so desired, leaving the material onto which the patch is deposited unharmed by the removal process. Alternately, the laser may remove both the patch material and any material covering and/or below the patch material. This is useful in instance where the thermocouple may be located within a TBC, or between a bond coat and TBC, or directly on the substrate etc. Furthermore, the laser may be used to trim the junction ends 20. As a result, the location of the second legs 16 on the component may be more tightly controlled, and the dimensions, in particular the width of the second legs 16, may be more tightly controlled.

More accurate positioning and width control allows for more accurate control of the electrical resistance of the thermocouple, and this greater control allows for thermocouple production to a tighter tolerance. A target loop resistance for a thermocouple, which is the resistance through the first and second legs of a given thermocouple, may be, for example, 2.2 ohms. However, conventional thermocouple manufacturing techniques may produce thermocouples with actual loop resistances of anywhere from 1.5 ohms to 3.3 ohms. This represents nearly a 30% deviation from the target loop resistance. It has been determined that using the process disclosed herein, actually loop resistance produced for the same target resistance range from approximately 1.9 ohms to 2.5 ohms. This represents a much reduced 15% deviation from the target loop resistance. In some instances the process produces actual loop resistances consistently within 10% of the target value.

Another method for monitoring the temperature of the component within the gas turbine engine includes using a thermal imager with a field of view to observe the component during operation. Such a system may require a calibration target including material of a known emissivity value over the high temperature range of turbine operation. A suitable material includes, for example, palladium, and a calibration target of suitable properties may by produced by using an APS deposition process. Conventional manufacturing techniques include a separate step to form the target. However, this step can conveniently be incorporated into the method disclosed herein.

Figure 6:
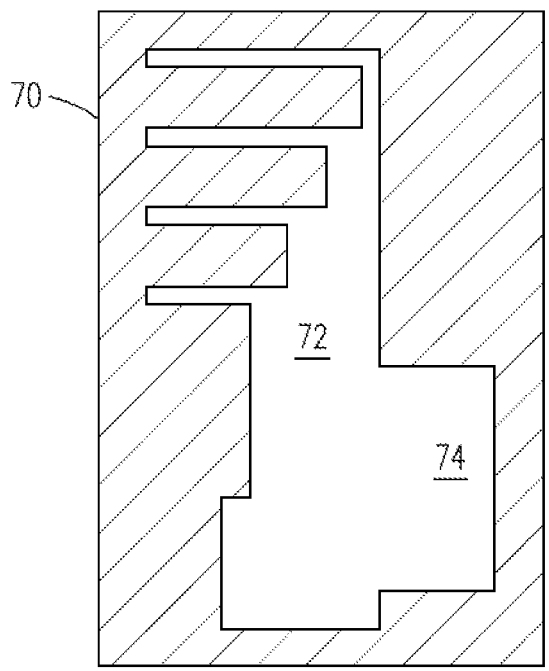
FIG. 6 shows an alternate exemplary embodiment of a mask.
Figure 7:
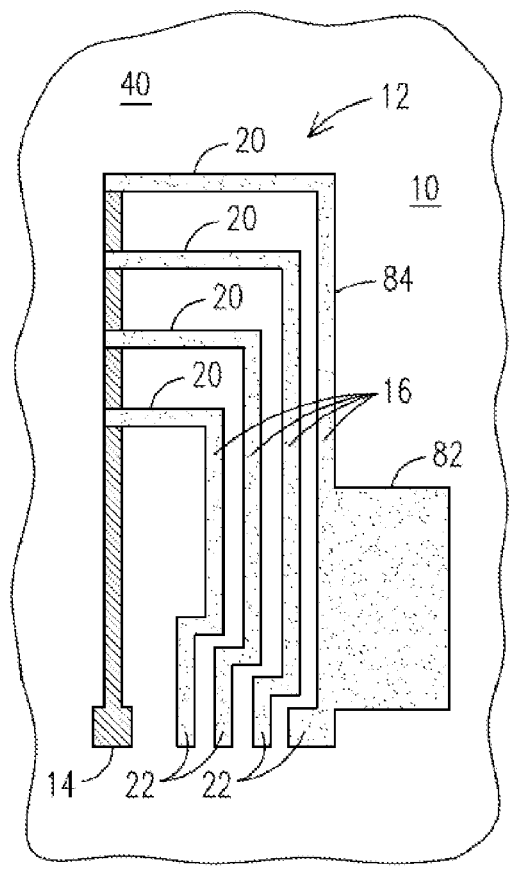
FIG. 7 shows the pattern of material applied to the surface of the component including a calibration target using the mask of FIG. 6.
Figure 8:
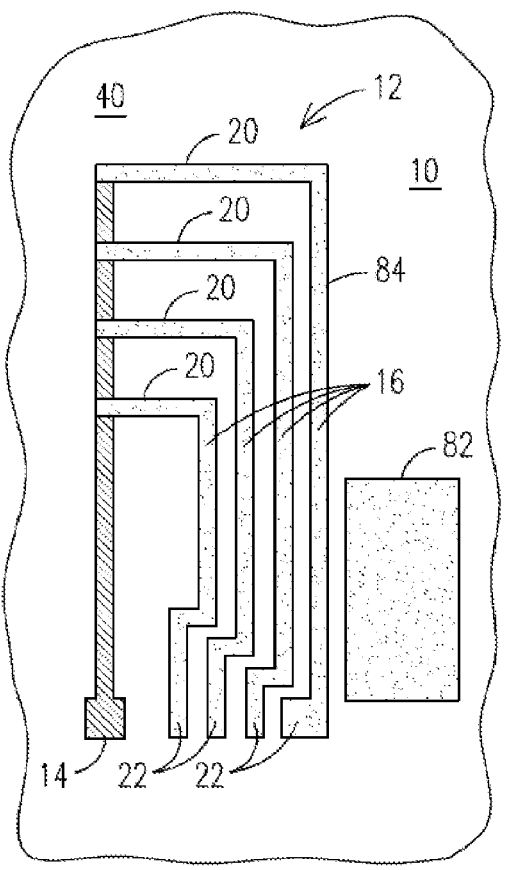
FIG. 8 shows the pattern of FIG. 7 with the calibration target electrically isolated.

As shown in FIG. 6, an alternate exemplary embodiment of the mask 70 includes an opening 72. In this exemplary embodiment the opening 72 is enlarged when compared to the opening 32 of FIG. 2. The opening enlargement 74 is sufficient to yield a patch large enough to include both the lead ends 22 of the second legs 16 and a calibration target. In FIG. 7 the mask 70 has been removed, the pattern has been deposited, and the lead ends 22 have been laser trimmed. Remaining are the first leg 14, second legs 16, and a calibration target 82 attached to a geometrically proximate second leg 84. The calibration target 82 may remain electrically connected to the geometrically proximate second leg 84, or it may be electrically isolated by laser trimming the calibration target 82 from the geometrically proximate second leg 84, as shown in FIG. 8.

Figure 9:
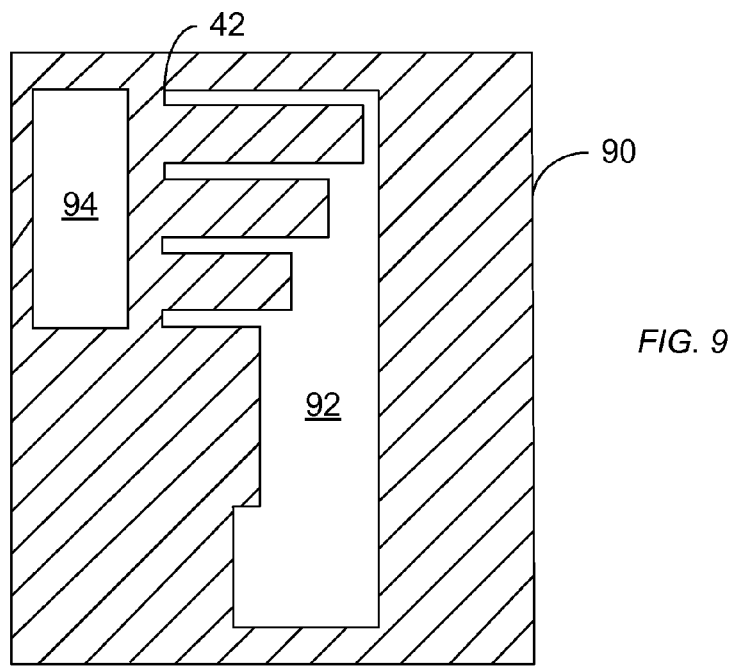
FIG. 9 shows an alternate exemplary embodiment of a mask.
Figure 10:
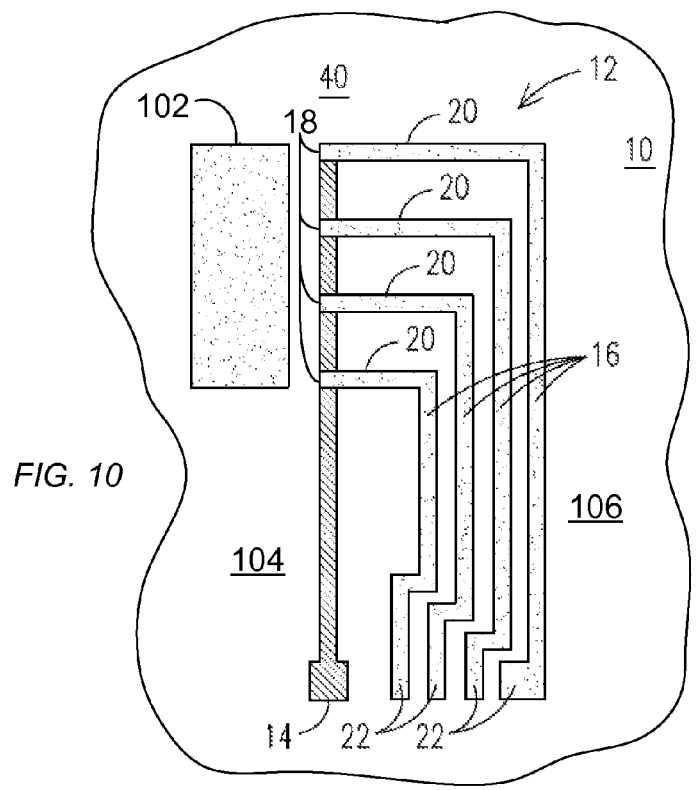
FIG. 10 shows the pattern of material applied to the surface of the component including a calibration target using the mask of FIG. 9

In an alternate exemplary embodiment shown in FIG. 9, a mask 90 includes an opening 92 for the pattern and an additional opening 94 for the calibration target. In this exemplary embodiment the additional opening 94 is disposed proximate the tips 42 of each of the openings for the junction ends of the second legs where the junctions 18 will be formed on the component. In FIG. 10 the mask 90 has been removed, the pattern has been deposited, and the lead ends 22 have been laser trimmed. Remaining are the first leg 14, second legs 16, junctions 18, and a calibration target 102 geometrically proximate the junctions 18. As shown the calibration target 102 is disposed on a first side 104 of the first leg 14 opposite a second side 106 of the first leg 14 where the second legs 16 are disposed. Being disposed proximate the junctions 18 will enable the calibration target and thermal imager to provide a second temperature reading for the component in the area proximate the junctions. This will serve to provide a more accurate temperature reading for that region of the component. Further, having temperature readings from both the thermocouples 12 and the calibration target 102 will provide redundancy, which can also be used to determine whether each system is working correctly. In all cases the calibration target is formed concurrently with the lead ends 22 of the second legs 16. As a result the cost of the calibration target 82 approaches a negligible value as compared to when it is installed as a separate step.

It has been shown that the method disclosed herein produces thin film thermocouples in a manner that reduces time and associated costs, improves the control of the thermocouple, and allows for the elimination of a separate step for forming a calibration target.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A method of forming a thermocouple on a contoured gas turbine hot gas path component, the method comprising:
    depositing a first material on the contoured gas turbine engine hot gas path component to form a first leg of the thermocouple;
    depositing a second material through a mask to form a pattern of the second material on the component, the pattern forming a plurality of discrete second leg junction ends and a continuous patch of the second material comprising second leg lead ends and excess second material connecting all of the second leg lead ends, each second leg junction end spanning from a respective junction with the first leg to the continuous patch; and
    laser-ablating the excess second material from the continuous patch while the continuous patch is uncovered to reveal the second leg lead ends, each second leg lead end electrically connected to a respective second leg junction end, thereby forming discrete second legs each comprising one second leg junction end and one second leg lead end,
    wherein the respective junctions are disposed on the component at locations effective to provide a temperature profile of the component during operation.

2. The method of claim 1, wherein the pattern comprises a plurality of layers, each associated with a cycle of a deposition process and each at least one micron thick.

3. The method of claim 2, wherein the deposition process comprises a plasma spraying process.

4. The method of claim 1, wherein the second material is characterized by a powder composition or slurry composition.

5. The method of claim 1, wherein the first and second materials each comprise a platinum group metal.

6. The method of claim 1, wherein the thermocouple comprises a measured loop-resistance value within 20% of a target loop-resistance value.

7. The method of claim 1, wherein the thermocouple comprises a measured loop-resistance value within 10% of a target loop-resistance value.

8. The method of claim 1, wherein the component comprises a superalloy substrate, or a bond coat or a ceramic coating onto which the pattern is deposited.

9. The method of claim 1, wherein the component comprises a blade or a vane or a ring segment.

10. The method of claim 1, wherein the continuous patch comprises a calibration target of material having sufficiently stable and known emissivity value to derive a temperature value when within a field of view of a thermal imager.

11. The method of claim 10, further comprising laser ablating the continuous patch to electrically isolate the calibration target from all of the second legs.

12. The method of claim 1, further comprising removing the mask before selectively laser ablating the second material.

13. A method of forming a thermocouple on a gas turbine engine hot gas path component, the method comprising:
depositing a first material on the component to form a first leg of the thermocouple;
depositing a second material through a mask to form a pattern of the second material on the component, the pattern forming a plurality of discrete second leg junction ends and a continuous patch of the second material comprising second leg lead ends and excess second material connecting all of the second leg lead ends, each second leg junction end spanning from a respective junction with the first leg to the continuous patch, wherein the pattern comprises a plurality of layers each associated with a cycle of a deposition process and each layer at least one micron thick, the pattern comprising a thickness of at least 10 microns; and
laser-ablating excess second material from the exposed continuous patch while the continuous patch is exposed to define the second lead ends, wherein each lead end is electrically connected to a respective second leg junction end, thereby forming discrete second legs each comprising one second leg junction end and one second leg lead end;
wherein the first and second materials each comprise a platinum group metal;
wherein the method is effective to produce a measured loop-resistance value of the thermocouple within 10% of a target loop-resistance value; and
wherein the junctions are disposed on the component at locations effective to provide a temperature profile of the component during operation.

14. The method of claim 13, wherein the target loop-resistance value is 2.2 ohms and the measured loop-resistance value is between 1.85 ohms and 2.55 ohms.

15. The method of claim 13, wherein the pattern comprises a calibration target of material having sufficiently stable and known emissivity value to derive a temperature value when within a field of view of a thermal imager.

16. The method of claim 13, wherein the pattern comprises a thickness from 50 microns to 100 microns.

17. The method of claim 13, wherein the component comprises a thermal barrier coating onto which the pattern is deposited.

18. The method of claim 13, further comprising removing the mask before selectively laser ablating the second material.

* * * * *